US010606948B2

(12) United States Patent
Hicks et al.

(10) Patent No.: US 10,606,948 B2
(45) Date of Patent: Mar. 31, 2020

(54) PREDICTIVE USER INTERFACE FOR VEHICLE CONTROL SYSTEM (71) Applicant: HONEYWELL INTERNATIONAL INC., Morris Plains, NJ (US)

(72) Inventors: Stephen Hicks, Phoenix, AZ (US); Steven L. Smith, Surprise, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 200 days.

(21) Appl. No.: 15/496,715

(22) Filed: Apr. 25, 2017

(65) Prior Publication Data

US 2018/0307670 A1 Oct. 25, 2018

(51) Int. Cl.
| | |
|---|---|
| *G06F 9/48* | (2006.01) |
| *G06F 17/27* | (2006.01) |
| *G06F 3/0482* | (2013.01) |
| *G06N 5/02* | (2006.01) |
| *G01C 23/00* | (2006.01) |
| *G06F 3/023* | (2006.01) |
| *G06F 3/0488* | (2013.01) |

(52) U.S. Cl.
CPC ......... *G06F 17/276* (2013.01); *G01C 23/005* (2013.01); *G06F 3/0237* (2013.01); *G06F 3/0482* (2013.01); *G06N 5/022* (2013.01); *G06F 3/04886* (2013.01)

(58) Field of Classification Search
CPC ......... G06F 3/0488; G06F 2203/04808; G06F 3/04886; G06F 3/0482; G06F 3/0237; G06F 17/276; G06N 5/022; G01C 23/005
See application file for complete search history.

(56) References Cited

U.S. PATENT DOCUMENTS

| | | | |
|---|---|---|---|
| 9,047,013 B2 * | 6/2015 | Sae-Chim | G06F 3/0489 |
| 9,092,748 B2 | 7/2015 | Greenlaw et al. | |
| 9,189,131 B2 | 11/2015 | Thiruvidam et al. | |
| 9,830,910 B1 * | 11/2017 | Shapiro | G08G 5/0013 |

(Continued)

FOREIGN PATENT DOCUMENTS

EP 2479647 A1 7/2012

OTHER PUBLICATIONS

Extended EP Search Report for Application No. 18168599.1-1221 dated Jul. 31, 2018.

*Primary Examiner* — Jennifer N To
*Assistant Examiner* — K C Chen
(74) *Attorney, Agent, or Firm* — Lorenz & Kopf, LLP (57) ABSTRACT A method of operating a user interface for a vehicle system includes receiving, by a processor, a user input from an input device. The method further includes comparing, by the processor, the user input to a plurality of stored user commands stored within a command database. The plurality of stored user commands is configured for controlling the system of the vehicle. The method additionally includes identifying, by the processor, a predicted user command based on the comparison of the user input to the plurality of stored user commands. Moreover, the method includes outputting, by an output device, the predicted user command. Also, the method includes receiving, by the input device, a user selection of the predicted user command output by the output device. Furthermore, the method includes controlling, by a controller, the system of the vehicle according to the user selection of the predicted user command.

12 Claims, 6 Drawing Sheets

(56) References Cited

U.S. PATENT DOCUMENTS

| | | | |
|---|---|---|---|
| 2004/0268259 A1* | 12/2004 | Rockey | G06F 3/0482 |
| | | | 715/708 |
| 2010/0311470 A1 | 12/2010 | Seo et al. | |
| 2013/0197917 A1 | 8/2013 | Dong et al. | |
| 2014/0350920 A1* | 11/2014 | Medlock | G06F 3/0237 |
| | | | 704/9 |
| 2016/0034250 A1* | 2/2016 | McCullough | G06F 3/017 |
| | | | 704/275 |
| 2016/0137289 A1* | 5/2016 | Violette | B64C 19/00 |
| | | | 701/14 |

\* cited by examiner

PREDICTIVE USER INTERFACE FOR VEHICLE CONTROL SYSTEM

TECHNICAL FIELD

The present disclosure generally relates to a user interface for a computerized control system, and more particularly relates to a predictive user interface for a computerized control system of a vehicle.

BACKGROUND

Many vehicles include computerized systems and one or more control systems for controlling those systems. For example, an aircraft may include such systems for controlling a flight management system, a navigation system, a display system, a communication system, and/or other systems.

In some cases, the vehicle may include a user interface (UI) that allows the user to interact with the computerized system(s). In the case of an aircraft, the UI may allow a crew member to complete various flight tasks, enter control commands, and the like within the various aircraft systems.

However, many UIs are confusing and inconvenient to use. In the case of an aircraft, there may be a number of tasks to complete at any given point in a flight. Accordingly, it is desirable to provide a more convenient user interface for computerized systems of a vehicle, such as an aircraft. Other desirable features and characteristics of the systems and methods of the present disclosure will become apparent from the subsequent detailed description and the appended claims, taken in conjunction with the accompanying drawings and the preceding background.

BRIEF SUMMARY

In one embodiment, a method of operating a user interface for at least one system of a vehicle is disclosed. The method includes receiving, by a processor, a user input from an input device. The method further includes comparing, by the processor, the user input to a plurality of stored user commands stored within a command database. The plurality of stored user commands is configured for controlling the at least one system of the vehicle. The method additionally includes identifying, by the processor, a predicted user command based on the comparison of the user input to the plurality of stored user commands. Moreover, the method includes outputting, by an output device, the predicted user command. Also, the method includes receiving, by the input device, a user selection of the predicted user command output by the output device. Furthermore, the method includes controlling, by a controller, the at least one system of the vehicle according to the user selection of the predicted user command.

In another embodiment, a user interface system for controlling at least one system of a vehicle is disclosed. The user interface system includes an input device and a command database configured for storage of a plurality of stored commands. The plurality of stored commands is configured for controlling the at least one system of the vehicle. Also, the user interface system includes a controller with a processor that is configured to compare a user input from the input device to the plurality of stored commands. The processor is configured to identify a predicted user command based on the comparison of the user input to the plurality of stored user commands. Also, the user interface system includes an output device configured to output the predicted user command. The input device is configured to receive a user selection of the predicted user command. Furthermore, the controller is configured to control the at least one system of the vehicle according to the user selection of the predicted user command.

In an additional embodiment, a user interface system for allowing a user to interact with a plurality of different systems of an aircraft is disclosed. The user interface system includes a control system with a processor. The control system is configured to generate and send a plurality of control signals for operating the plurality of different systems of the aircraft. The user interface system also includes a command database that includes a plurality of command names. The plurality of command names are each associated with a respective one of the plurality of control signals. Additionally, the user interface system includes an input device and a display that cooperate to provide a user interface. The input device is configured to receive a user input from the user. The processor is configured to receive the user input, compare the user input to the plurality of command names, and determine whether the user input satisfies a criteria associated with the comparison. The display is configured to display a command that satisfies the criteria. The input device is configured to receive a selection of the command. Also, the control system is configured to send a control signal to the plurality of different systems of the aircraft based on the selection.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In addition, those skilled in the art will appreciate that embodiments of the present disclosure may be practiced in conjunction with any method and/or system associated with a predictive user interface for a computerized vehicle control system. It will also be appreciated that the user interface methods and systems described herein are merely exemplary and configured according to the present disclosure. Further, it should be noted that many alternative or additional functional relationships or physical connections may be present in an embodiment of the present disclosure. In addition, while the figures shown herein depict examples with certain arrangements of elements, additional intervening elements, devices, features, or components may be present in an actual embodiment.

Figure 1:
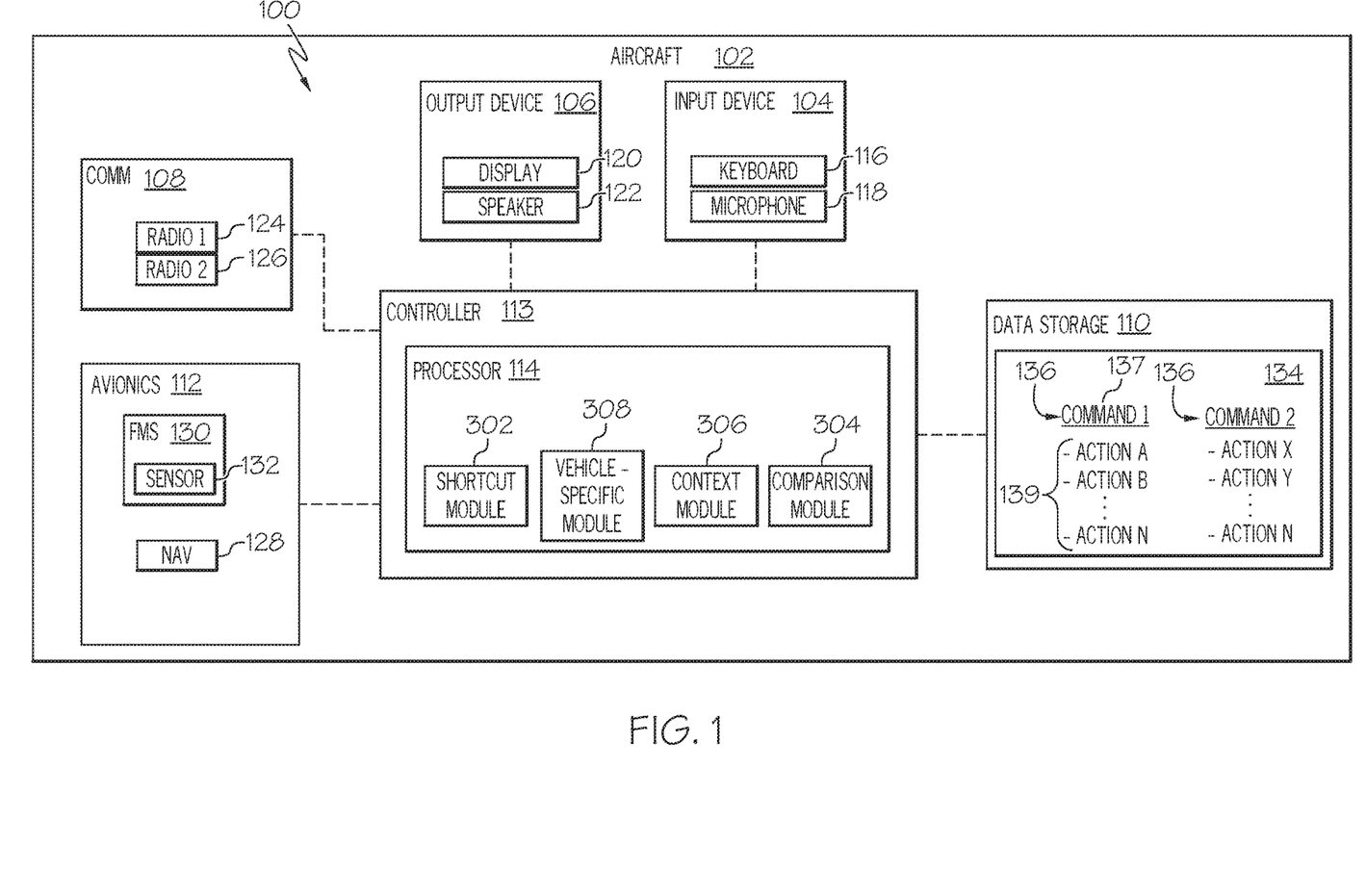
FIG. 1 is a block diagram of an example embodiment of a system suitable for use in a vehicle according to the present disclosure.

FIG. 1 depicts an exemplary embodiment of a system 100 which may be associated with a vehicle, such as an aircraft 102. It will be appreciated that the system 100 may be configured for other vehicles, such as cars, trucks, boats, etc., without departing from the scope of the present disclosure.

As will be discussed in detail, the system 100 provides a user interface that streamlines the ability of the user to perform actions by predicting commands, tasks, actions, and/or other user inputs. The system 100 may provide these predictions based on a context-sensitive entry logic. In some embodiments, the system 100 is configured to detect a vehicle condition, and the system 100 bases its predictions, at least in part, on the detected vehicle condition(s). Accordingly, the system 100 may provide accurate, applicable, and relevant predictions to the user.

Additionally, the system 100 may provide a centralized user interface for inputting commands to a variety of systems of the aircraft 102. The system 100 may allow the user to control these different systems with relative ease.

In an exemplary embodiment, the system 100 may include, without limitation, an input device system 104, an output device system 106, a communication system 108, a data storage element 110, one or more avionics systems 112, and a control system 113 with at least one processor 114, suitably configured to support operation of the system 100 as described in greater detail below. It will be understood that FIG. 1 is a simplified representation of the system 100 for purposes of explanation and ease of description, and that FIG. 1 is not intended to limit the application or scope of the subject matter in any way. Practical embodiments of the system 100 may vary from the illustrated embodiment without departing from the scope of the present disclosure. Also, the system 100 may include numerous other devices and components for providing additional functions and features, as will be appreciated in the art.

As shown, the input device system 104 may include a keyboard 116 and a microphone 118. The input device system 104 may also include, for example, a control joystick, a pointer device, a touch sensitive surface (e.g., a touch sensitive display), an electronic flight bag, a portable electronic device, and/or another device that allows the user to input information into the system 100. In some embodiments, the input device system 104 may include more than one type of input element. Furthermore, in some embodiments, the input device system 104 may be used by the pilot or other crew member to control the aircraft 102 (e.g., to change the aircraft's speed, trajectory, etc.). In additional embodiments, the system 100 may be used to override automated functions of the system 100. In an exemplary embodiment, the input device 104 is coupled to and in communication with the control system 113 and the processor 114 over a suitable architecture that supports the transfer of data, commands, power, etc. Additionally, the input device 104 and the processor 114 are cooperatively configured to allow a user to interact with other elements of the system 100 as will be discussed in more detail below.

Also, in the illustrated embodiment, the output device system 106 may include a display 120 (i.e., a visual output device) and a speaker 122 (i.e., an audio output device). The display 120 and the speaker 122 may be coupled to the processor 114 over a suitable architecture that enables the transfer of data, commands, power, etc. In some embodiments, the output device system 106 may be included in an electronic flight bag, a portable electronic device, and/or another device that outputs information to the user. It will be appreciated that the display 120 and the speaker 122 are example output devices of the system 106 and that the system 106 may include different output devices without departing from the scope of the present disclosure.

The display 120 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 120 may additionally be implemented as a panel mounted display, a HUD (head-up display) projection, a head-mounted display, a near-to-eye (NTE) display, and/or any one of numerous known technologies. It is additionally noted that the display 120 may be configured as any one of numerous types of aircraft flight deck displays. For example, it may be configured as a multi-function display, a horizontal situation indicator, a vertical situation indicator (VSD), or an interactive navigational display (iNAV). Also, the display 120 may be configured as a primary flight display (PFD). Furthermore, the display 120 may be coupled to the control system 113 and the processor 114 over a suitable architecture that supports the transfer of data, commands, power, etc. The control system 113, the processor 114, and the display 120 may be cooperatively configured to display, render, or otherwise convey one or more graphical representations or images associated with operation of the aircraft 102 on the display 120. It will be appreciated that although FIG. 1 shows a single display 120, in practice, additional display devices may be included in the system 100.

The speaker 122 may be of any suitable type for outputting audio from the system 100 to the user. The speaker 122 may provide sounds that correspond to the visual data output from the display 120. The control system 113, the processor 114, and the speaker 122 may be cooperatively configured to output one more audible representations associated with operation of the aircraft 102. It will be appreciated that although FIG. 1 shows a single speaker 122, in practice, additional audio devices may be included in the system 100.

Moreover, the communication system 108 may include a first radio device 124 and a second radio device 126. In an exemplary embodiment, the communication system 108 is coupled to the control system 113 and the processor 114 with a suitable architecture that supports the transfer of data, commands, power, etc. The communication system 108 may be configured to support communications to the aircraft 102, from the aircraft 102, and/or within the aircraft 102, as will be appreciated in the art. In this regard, the communication system 108 may be realized using any non-radio communication system or another suitable data link system. In an exemplary embodiment, the communication system 108 is suitably configured to support communications between the aircraft 102 and another aircraft or ground location (e.g., air traffic control equipment and/or personnel).

Additionally, the avionics system 112 may include and/or may be associated with systems that are configured to support flight and associated operations of the aircraft 102. For example, the avionics system 112 may include a flight control system, an air traffic management system, a radar system, a traffic avoidance system, an enhanced ground proximity warning system, an autopilot system, an auto-thrust system, a flight control system, a weather system, an electronic flight bag and/or another suitable avionics system. It will be appreciated that although only one avionics system 112 is shown in the Figures, that the system 100 may include a plurality of avionics systems without departing from the scope of the present disclosure.

As shown in FIG. 1, the avionics system 112 may include and/or may be associated with a flight management system 130. The flight management system 130 may be operable for obtaining and/or providing real-time flight-related information. Accordingly, the flight management system 130 may include one or more sensors 132 that detect this real-time information. Specifically, the sensor 132 may include an altimeter that detects the current altitude of the aircraft 102. Also, the sensor 132 may be configured to detect the current, real-time trajectory of the aircraft 102, the airspeed of the aircraft 102, etc.

Furthermore, in an exemplary embodiment, the flight management system 130 maintains information pertaining to a current flight plan (or alternatively, a current route or travel plan). In accordance with one or more embodiments, the flight management system 130 (or another avionics system 112) is configured to determine, track, or otherwise identify the current operating state (e.g., flight phase or phase of flight) of the aircraft 102, as described in greater detail below. The sensor 132 may be configured to detect one or more of these phases of flight of the aircraft 102. Various phases of flight are well known (e.g., a standing phase, a pushback or towing phase, a taxiing phase, a takeoff phase, a climbing phase, a cruising phase, a descent phase, an approach phase, a landing phase, and the like) and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases. In addition to delineated flight phases, the flight management system 130 may identify other operating states of the aircraft 102, such as, for example, operation with one or more engines disabled, operation when afterburners onboard the aircraft 102 are being utilized, transonic and/or supersonic operation of the aircraft 102, and the like. In reality, the flight phases may not necessarily be entirely distinct from each other, and one phase may overlap with one another. Additionally, the flight management system 130 and/or other system may determine the current flight phase indirectly. For example, a weight-on-wheels sensor may be configured to detect that the aircraft 102 has landed.

Additionally, the avionics system 112 may include or may be associated with the navigation system 128. The navigation system 128 may be configured to obtain one or more navigational parameters associated with operation of the aircraft 102. The navigation system 128 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 128, as will be appreciated in the art.

The data storage element 110 may be realized as RAM memory, flash memory, EPROM memory, EEPROM memory, registers, a hard disk, a removable disk, a CD-ROM, or any other form of storage medium known in the art. In this regard, the data storage element 110 can be coupled to the control system 113 and the processor 114 such that the processor 114 can read information from (and, in some cases, write information to) the data storage element 110. In the alternative, the data storage element 110 may be integral to the processor 114. As an example, the processor 114 and the data storage element 110 may reside in an ASIC. In practice, a functional or logical module/component of the display 120 might be realized using program code that is maintained in the data storage element 110. Moreover, the data storage element 110 may include and/or access databases suitably configured to support operations of the system 100, such as, for example, a terrain database, an obstacle database, a navigational database, a geopolitical database, a terminal airspace database, a special use airspace database, or other information.

The data storage element 110 may include at least one command database 134. The command database 134 may include a plurality of stored user commands 136. As an example, FIG. 1 includes two stored user commands 136; however, it will be appreciated that the command database 134 may include any number of user commands 136. In some embodiments, at least one command 136 may have a command name 137 and an action list 139. As will be discussed, the command name 137 may be used for predicting commands, and the action list 139 may include one or more actions to be performed when that command is selected by the user.

More specifically, the control system 113 may utilize the action list 139 of the stored commands 136 to generate and send control signals to one or more of the systems of the aircraft 102. For example, the control system 113 may use the action list 139 of the first stored user command 136 to control the output device system 106, the communication system 108, and/or the avionics system 112. Likewise, the control system 113 may use the action list 139 of the second stored user command 136 to control the output device system 106, the communication system 108, and/or the avionics system 112.

The control system 113 and the processor 114 generally represent the hardware, software, and/or firmware components configured to facilitate communications and/or interaction between the input device system 104, the output device system 106, the communication system 108, the avionics system 112, and the data storage element 110. The control system 113 and the processor 114 may also perform additional tasks and/or functions described in greater detail below.

Depending on the embodiment, the processor 114 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 114 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 114 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processor 114, or in any practical combination thereof.

In some embodiments, the features and/or functionality of the processor 114 may be implemented as part of the flight management system 130 or another avionics system 112, as will be appreciated in the art. The processor 114 may be coupled to the navigation system 128 for obtaining real-time navigational data and/or information regarding operation of the aircraft 102 to support operation of the system 100. The processor 114 may also be coupled to the flight management system 130, which in turn, may also be coupled to the navigation system 128, the communication system 108, and one or more additional avionics systems 112 to support navigation, flight planning, and other aircraft control functions, as well as to provide real-time data and/or information regarding operation of the aircraft 102 to the processor 114.

Figure 2:
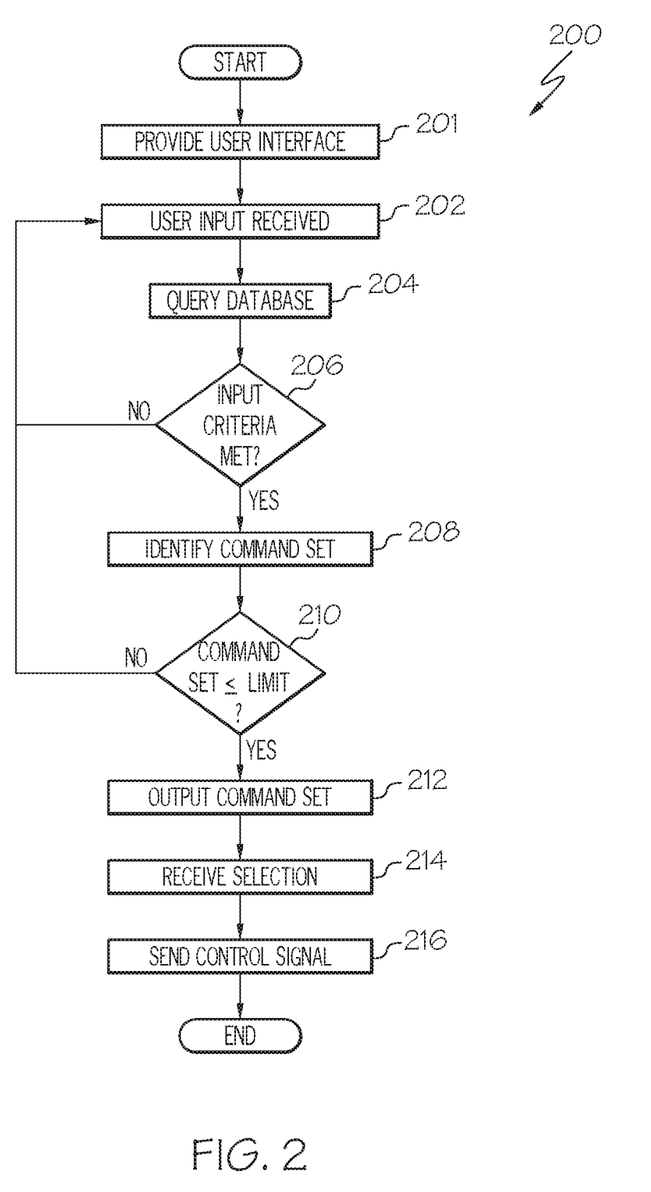
FIG. 2 is a flowchart illustrating an example embodiment of a method for operating the system of FIG. 1.
Figure 3A:
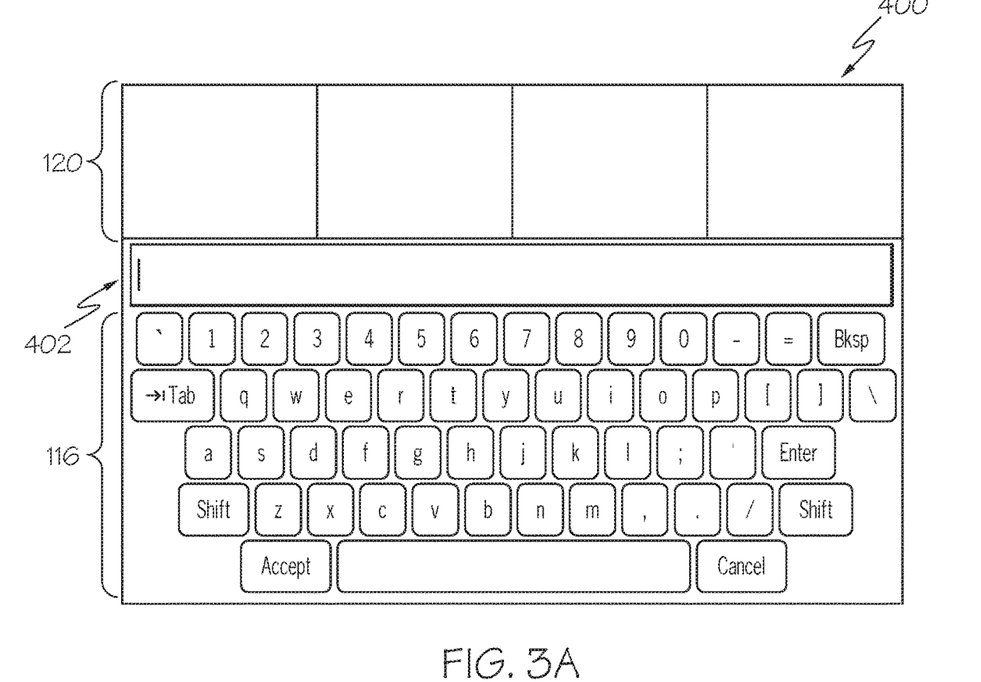
FIGS. 3A-3D are schematic views of a user interface of the system of FIG. 1 illustrating example interactions between a user and the system of FIG. 1.

Referring now to FIG. 2, a method 200 of operating the system 100 will be discussed according to example embodiments. The method 200 may begin at 201, wherein a user interface 400 is provided. As shown in FIG. 3A, the user interface 400 may be cooperatively defined by the keyboard 116 and the display 120. In some embodiments, the display 120 may be touch-sensitive and the keyboard 116 may be a virtual keyboard. Accordingly, the keyboard 116 and the display 120 may be integrated together in a single device. The user interface 400 may also include a command prompt 402.

In some embodiments, the user interface 400 may be a top-level default screen that is presented to the user upon power-up of the system 100 and/or at other times. Also, the user interface 400 may be available before, during, and after flight. Moreover, it will be appreciated that the look and feel of the user interface 400 may be configured to help keep the user's attention focused and to facilitate entry and execution of user commands to the various systems of the aircraft 102.

As shown in FIG. 2, the method 200 may continue at 202, wherein a user input is received. For example, the user may type in one or more alphanumeric characters (i.e., user input) at the prompt 402 using the keyboard 116, and a corresponding signal may be sent to the processor 114. In additional embodiments, the user may speak into the microphone 118 to provide audible user input.

At step 204 of the method 200, the processor 114 may query the command database 134. Then, at 206 of the method 200, the processor 114 may determine whether the input received at 202 satisfies one or more criteria. For example, the processor 114 may compare the input to the names 137 of the stored commands 136 within the command database 134 to determine whether they sufficiently match. As will be discussed, the processor 114 may consider other criteria, such as the operating condition of the aircraft 102, the current flight phase of the aircraft 102, vehicle-specific information, or other factors when determining whether the user input received at 202 satisfies the criteria. If the input does not satisfy the criteria (i.e., block 206 answered negatively), the method 200 may loop back to 202.

If the input does satisfy the criteria (i.e., block 206 answered affirmatively), the method 200 may continue at 208, wherein the processor 114 identifies the stored user commands 136 that satisfy the criteria. Next, at 210, the processor 114 may determine whether the set of stored user commands 136 identified at 208 is less than or equal to a predetermined limit. If the set of commands 136 exceeds the limit (i.e., block 210 answered negatively), then the method 200 may loop back to block 202. If the set of commands 136 is less than or equal to the limit (i.e., block 210 answered affirmatively), then the method 200 may continue at 212.

At block 212 of the method 200, the system 100 may output the set of commands 136 identified at 208 to the user. For example, the control system may send control signals to the display 120 to show the commands 136 identified at 208. In additional embodiments, the control system may send control signals to the speaker 122 to audibly output the set of commands 136 identified at 208. The commands 136 may be output so that the user has the option to select one or more of the commands 136.

Next, at 214 of the method 200, the system 100 may receive the user's selection. Specifically, the user may select one of the commands 136 output at 212 using the keyboard 116, the microphone 118, and/or another device of the input device system 104. Then, at 216, the control system 113 may output control signals that correspond to the command 136 selected at 214. In some embodiments, the processor 114 may retrieve the action list 139 from the command database 134 and the control system 113 may output control command signals to the systems included in the action list 139. It will be appreciated that the communication system 108, the FMS 130, the navigation system 128, the input device system 104, the output device system 106, the communication system 108, and/or any other system of the aircraft 102 may be controlled in this manner. For example, altitude, trajectory, and/or other factors affecting flight of the aircraft 102 may be controlled in this manner. Also, the system 100 may be used to control data entry into one or more systems. For example, the system 100 may control the FMS 130 to record various changes to the flight plan. Also, the system may be used to control maps or other items displayed on the display 120. Furthermore, the first and/or second radio devices 124, 126 may be controlled using the system 100.

A scenario will now be discussed as a way of further illustrating the system 100 (FIG. 1) and the method 200 (FIG. 2) of the present disclosure. It will be assumed that the aircraft 102 is midflight, and that air traffic control sends instructions via the communication system 108 to "change flight level to two-four-zero" to the aircraft 102. With the received instructions, the user (at 202 of the method 200) may begin to enter the number "240" at the command prompt 402 using the keyboard 116. It is noted that the user need not enter the entire instruction from air traffic control. Rather, the user may simply enter key information—here, the numerical value of the target flight level.

In some embodiments, the system 100 may proceed through steps 202 through 210 of the method with each key stroke (i.e., each progressive input) by the user. The system 100 may also automatically proceed through these steps upon receiving each progressive user input. Thus, the user may initially key in the number "2", whereupon the processor 114 may query the command database 134 (at 204), compare this user input to the command names 137 (at 206), and identify the command names 137 that include the number "2" (at 208). Then, the processor 114 may identify the set of commands 136 corresponding to those that include the number "2" at block 208 of the method 200. Next, the processor 114 may determine whether the set of commands 136 identified at 208 exceeds the predetermined limit. Assuming that the number of identified commands 136 exceeds the limit, then the method 200 may loop back to 202.

Figure 3B:
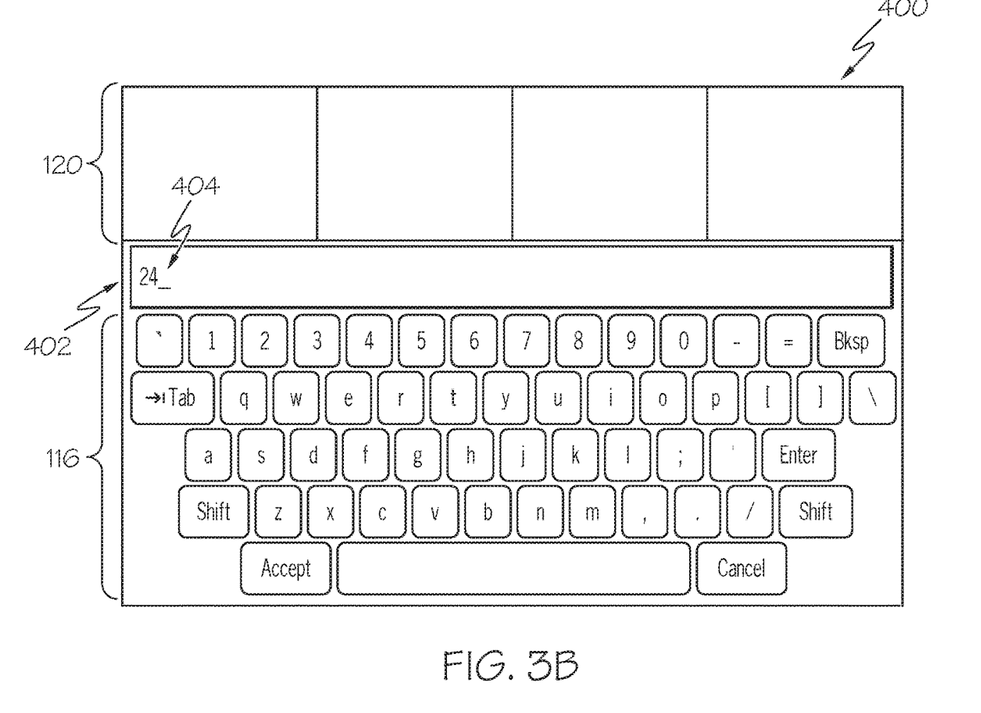

The user may add the number "4" to the command prompt 402 as shown in FIG. 3B. Similar to the method steps recited above, the system 100 may once again find that there are too many commands 136 with names 137 that include the numbers "2" and "4" (i.e., decision block 210 answered negatively). Therefore, the method 200 may loop, once again, back to 202. The method 200 may continue in this loop until the set of user commands 136 identified at 208 is less than the predetermined limit.

Figure 3C:
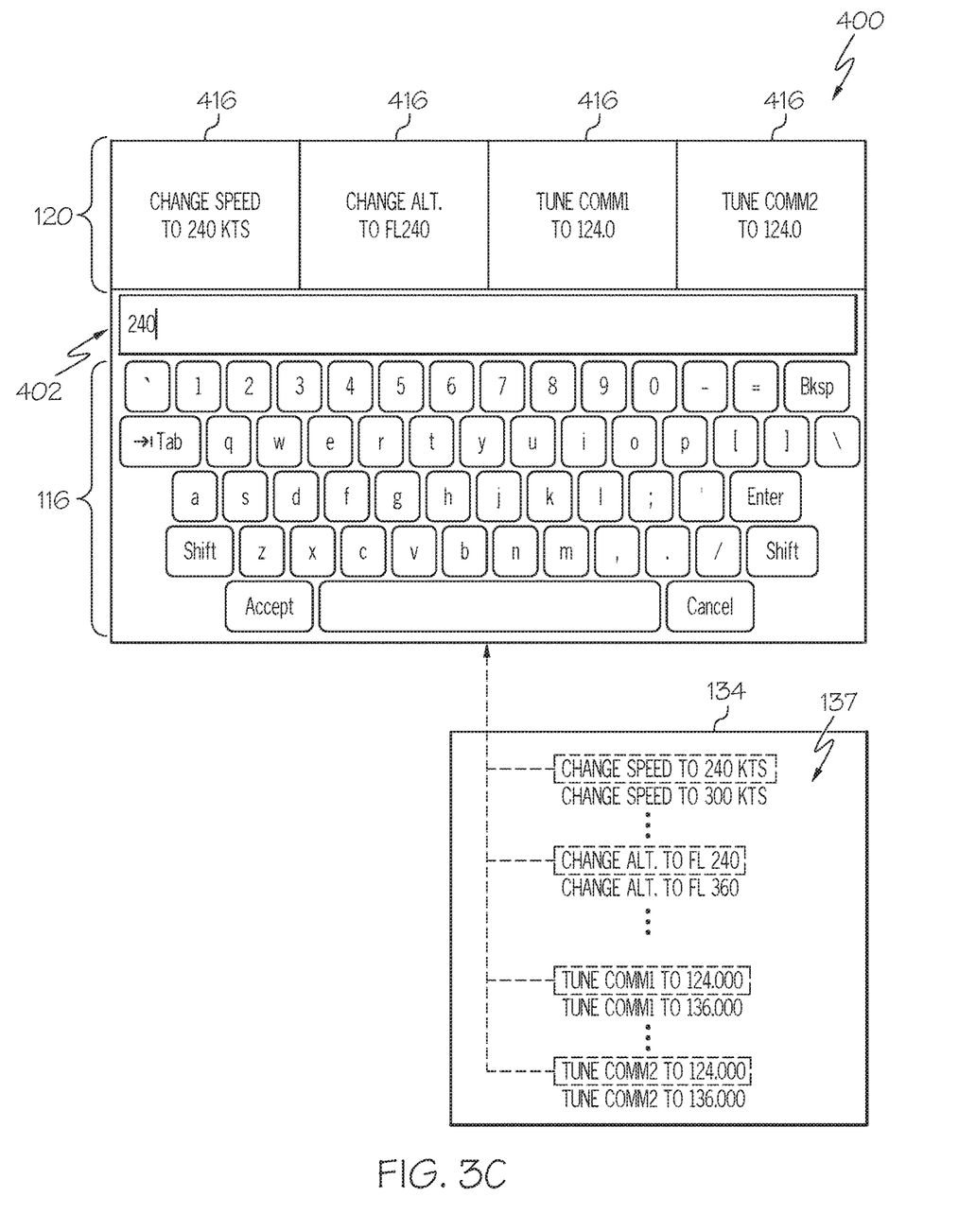

As shown in FIG. 3C, the user may add a "0" to the command prompt 402. Again, the processor 114 (at 206) may identify the commands 136 with names 137 that include the number "240". As shown in FIG. 3C, the command database 134 may include two such command names, namely the "Change Speed to 240 kts" command and "Change Altitude to FL240" command. Accordingly, the processor 114 may recognize the match and select those commands at block 208 of the method 200. Those commands may be displayed on the display 120 as shown in FIG. 3C. Other commands (e.g., "Change Speed to 300 kts" and "Change Altitude to FL360") may be omitted since they do not match. It will be appreciated that the stored commands 136 that are shown are mere examples. In another embodiment, the stored commands 136 may be applicable to a range of values.

Figure 4:
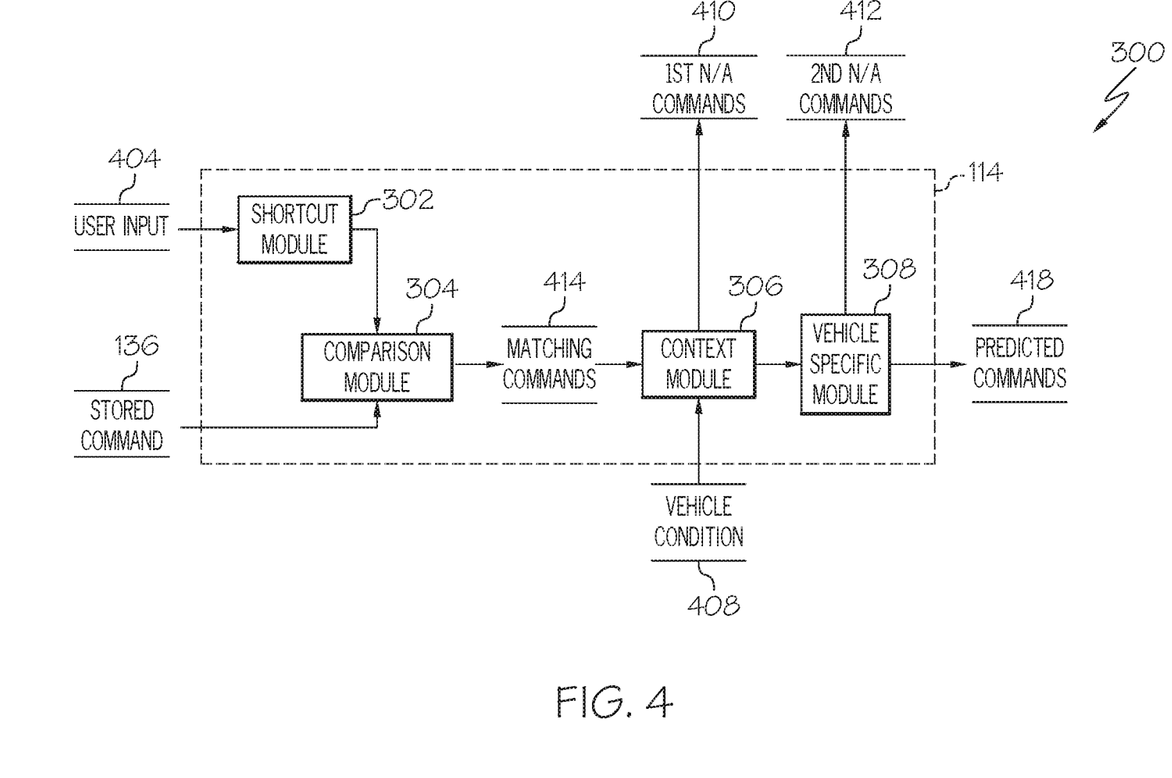
FIG. 4 is a dataflow diagram of the system of FIG. 1 according to example embodiments.

In some embodiments represented in FIGS. 1 and 4, the processor 114 may include a comparison module 304. The comparison module 304 may comprise control logic for comparing the user input entered at the prompt 402 to the command names 137 as described above.

Also, in some embodiments represented in FIG. 4, the processor 114 may include a shortcut module 302. The shortcut module 302 may include programmed logic that accounts for certain shortcuts that the user may make in entering the user input at the prompt 402. The shortcut module 302 may account for terms of art, vernacular, particular data entry techniques, and/or conventions used within the field of aviation. For example, as shown in FIG.

3C, the command database 134 may include the stored command 136 "Tune Comm1 to 124.0" and "Tune Comm2 to 124.0". Even though there is a decimal point between the "4" and the "0" in these commands, the processor 114 may still recognize these commands as satisfying the criteria of decision block 206, and the commands may be displayed on the display 120 as shown in FIG. 3C.

As shown in the example dataflow diagram of FIG. 4, the processor 114 may receive the user input 404 entered at the prompt 402. The user input 404 may be processed through the shortcut module 302 and the result may be compared to the stored commands 136 via the comparison module 304. The comparison module 304 may output matching commands 414. As described above, the comparison module 304 may compare the command names 137 to the user input 404 and output those that include matching alphanumeric characters as discussed above.

Furthermore, in some embodiments, the processor 114 may include a context module 306. The context module 306 may include control logic for determining one or more conditions of the aircraft 102. For example, in some embodiments, the context module 306 may be configured to determine the current flight phase of the aircraft 102. In some embodiments, the context module 306 may receive vehicle condition data 408 (FIG. 4), for example, from the sensor 132 (FIG. 1) to determine the current flight phase. Also, the context module 306 may receive the matching commands 414 as shown in FIG. 4. The context module 306 may choose those of the matching commands 414 that are applicable to the current flight phase. In other words, the context module 306 may process the matching commands 414 and filter out first nonapplicable commands 410 (i.e., those of the matching commands 414 that are irrelevant and/or out-of-context for the current flight phase). Continuing with the example of FIGS. 3A-3C, the context module 306 may determine that the aircraft 102 is midflight. Thus, if there is a matching command 414 that is related to landing the aircraft 102, the context module 306 may filter it out as a nonapplicable command 410.

Moreover, the processor 114 may include a vehicle specific module 308. The vehicle specific module 308 may include control logic for further filtering the matching commands 414. In some embodiments, the vehicle specific module 308 may include rules and/or other logic regarding the particular model of the aircraft 102. For example, the aircraft 102 may have a predetermined maximum altitude, a maximum or minimum airspeed, or other specification. The vehicle specific module 308 may rely on these specifications and choose those of the matching commands 414 that satisfy those rules. In other words, the vehicle specific module 308 may filter out matching commands 414 that violate these rules. For example, if the matching command 414 includes a command to change altitude to a level that exceeds the maximum of the aircraft 102, the vehicle specific module 308 may filter it out as a nonapplicable command 412.

The processor 114 may output predicted commands 418 that pass through the processing and filtering of the shortcut module 302, the comparison module 304, the context module 306, and the vehicle specific module 308. In the embodiment of FIG. 3C, the processor 114 identifies four commands 136 satisfying the criteria of decision of block 206 of the method 200.

It is assumed that the four commands 136 is less than the limit of block 210. Thus, at 212, these commands 136 (i.e., command predictions) are displayed on the display 120. In some embodiments, the commands 136 are displayed in individual areas 416 within the display 120. The areas 416 may be selected by the user to enter the command and to complete the associated tasks.

Figure 3D:
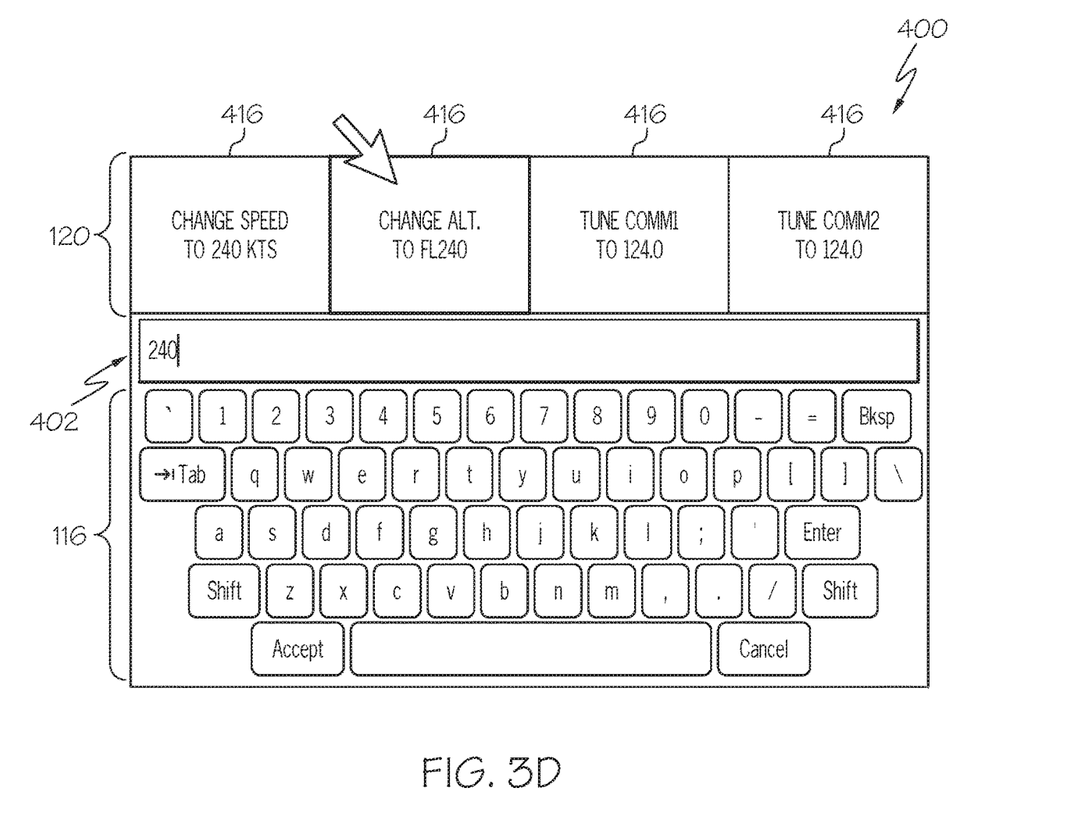

Continuing with the example, the user selects the command 136 "Change Altitude to FL240" as shown in FIG. 3D. The processor 114 receives the selection (at block 214 of the method 200). Accordingly, at 216, the processor 114 causes the control system to output corresponding control signals. In some embodiments, the control system outputs control signals according to the action list 139 associated with the selected command 136. In this example, the action list 139 may involve controlling the avionics system 112 as well as the display 120. For example, the control system may follow the action list 139 and send control signals to an autopilot system within the avionics system 112 and/or to the navigation system 128 for planning a new trajectory. In addition, the control system 113 may, according to the action list 139, cause an update to the flight plan within the FMS 130 and/or another record of the flight. Moreover, the control system 113 may, according to the action list 139, cause the display 120 to automatically display a map (e.g., an elevational map) to show the altitude change to the crew members.

In some scenarios, the commands 136 output at 212 of the method 200 may not include the desired command of the user. As such, the method 200 may loop back to 202 so that the user may provide additional input. The additional input may compound what has already been entered, or the additional input may include edits to what was previously entered. Then, the method 200 may proceed as discussed above, and the commands 136 output at 212 may include the user's desired command.

Accordingly, the system 100 and the method 200 of the present disclosure provides a convenient and user-friendly interface with which the user can enter commands to complete various tasks. The system 100 may provide useful and helpful predictions of highly relevant commands. Also, the user interface may allow for automatic and substantially simultaneous control of various systems in response to a single command selection by the user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed is:

1. A method of operating a user interface for a first system and a second system of a vehicle, the method comprising:

receiving, by a processor, a command variable;

identifying, by the processor, a first command and a second command from the received command variable, the first command including the command variable and configured for controlling the first system, the second command including the command variable and configured for controlling the second system;

determining, by the processor, a current condition of the vehicle;

filtering, by the processor, the identified first and second commands, including filtering out one of the identified first and second commands that are nonapplicable for the determined current condition of the vehicle, and including determining a predicted user command is the other of the first and second commands and is applicable for the determined current condition of the vehicle;

outputting, by an output device of the user interface, the predicted user command for selection by a user;

receiving, by an input device, a user selection of the predicted user command output by the output device;

controlling, by a controller, at least one of the first system and the second system of the vehicle according to the user selection;

wherein receiving the command variable includes receiving an initial user input and a subsequent user input that adds to the initial user input; and wherein identifying the first command and the second command includes identifying a command that includes the initial user input and subsequently identifying the command that includes both the initial user input and the subsequent user input.

2. The method of claim 1, wherein the vehicle is an aircraft; and wherein determining the current condition includes determining a current flight phase of the aircraft;

further comprising determining the predicted user command is the other of the first and second commands and is applicable to the determined current flight phase.

3. The method of claim 1, wherein determining the predicted user command includes determining those of the identified first and second commands that satisfy a vehicle specific criteria; and wherein determining the predicted user command includes determining the predicted user command is the other of the first and second commands and satisfies the vehicle specific criteria.

4. The method of claim 1, further comprising receiving, from an input device, a user input;

further comprising determining, by the processor, that the user input is a shortcut input; and processing, by the processor, the shortcut input to generate the command variable.

5. The method of claim 1, wherein determining the predicted user command includes determining a plurality of predicted user commands; and further comprising limiting a number of the plurality of predicted user commands simultaneously output by the output device.

6. The method of claim 1, wherein receiving the command variable includes receiving a text-based command variable input from the input device.

7. A user interface system for controlling a first system and a second system a vehicle, the user interface comprising:

an input device;

a command database having a first command configured for controlling the first system of the vehicle and having a second command configured for controlling the second system of the vehicle;

a sensor configured to sense a current condition of the vehicle;

a controller with a processor that is configured to receive a command variable that is input via the input device, the processor configured to identify the first command and the second command from the received command variable, the first command incorporating the command variable and configured for controlling the first system, the second command incorporating the command variable and configured for controlling the second system, the processor configured to filter out one of the identified first and second commands that are nonapplicable for the current condition of the vehicle sensed by the sensor, the processor configured to determine a predicted user command is the other of the identified first and second commands and is applicable for the current condition of the vehicle sensed by the sensor;

an output device configured to output the predicted user command for selection by a user;

the input device being configured to receive a user selection of the predicted user command;

the controller configured to control at least one of the first system and the second system according to the user selection;

wherein the processor is configured to receive the command variable as an initial user input and a subsequent user input that adds to the initial user input; and wherein the processor is configured to identify the first command and the second command by identifying a command that includes the initial user input and subsequently identifying the command that includes both the initial user input and the subsequent user input.

8. The user interface system of claim 7, wherein the vehicle is an aircraft; and the sensor is configured to sense a current flight phase of the aircraft;

wherein the processor is configured to determine the predicted user command is the other of the first and second commands and is applicable to the sensed current flight phase.

9. The user interface system of claim 7, wherein the processor is configured to determine the predicted user command by determining those of the identified first and second commands that satisfy a vehicle-specific criteria; and wherein the processor is configured to determine the predicted user command is the other of the first and second commands and satisfies the vehicle-specific criteria.

10. The user interface system of claim 7, wherein the input device is configured to receive a user input;

wherein the processor is configured to determine that the user input is a shortcut input; and wherein the processor is configured to process the shortcut input to generate the command variable.

11. The user interface system of claim 7, wherein the processor is configured to determine a plurality of predicted user commands; and wherein the processor is configured to limit a number of the plurality of predicted user commands simultaneously output by the output device.

12. The user interface system of claim 7, wherein the command variable is a text-based command variable input from the input device.

* * * * *